Oct. 20, 1936. H. W. WHITAKER 2,057,990
ENGINE MOUNT
Filed July 10, 1934
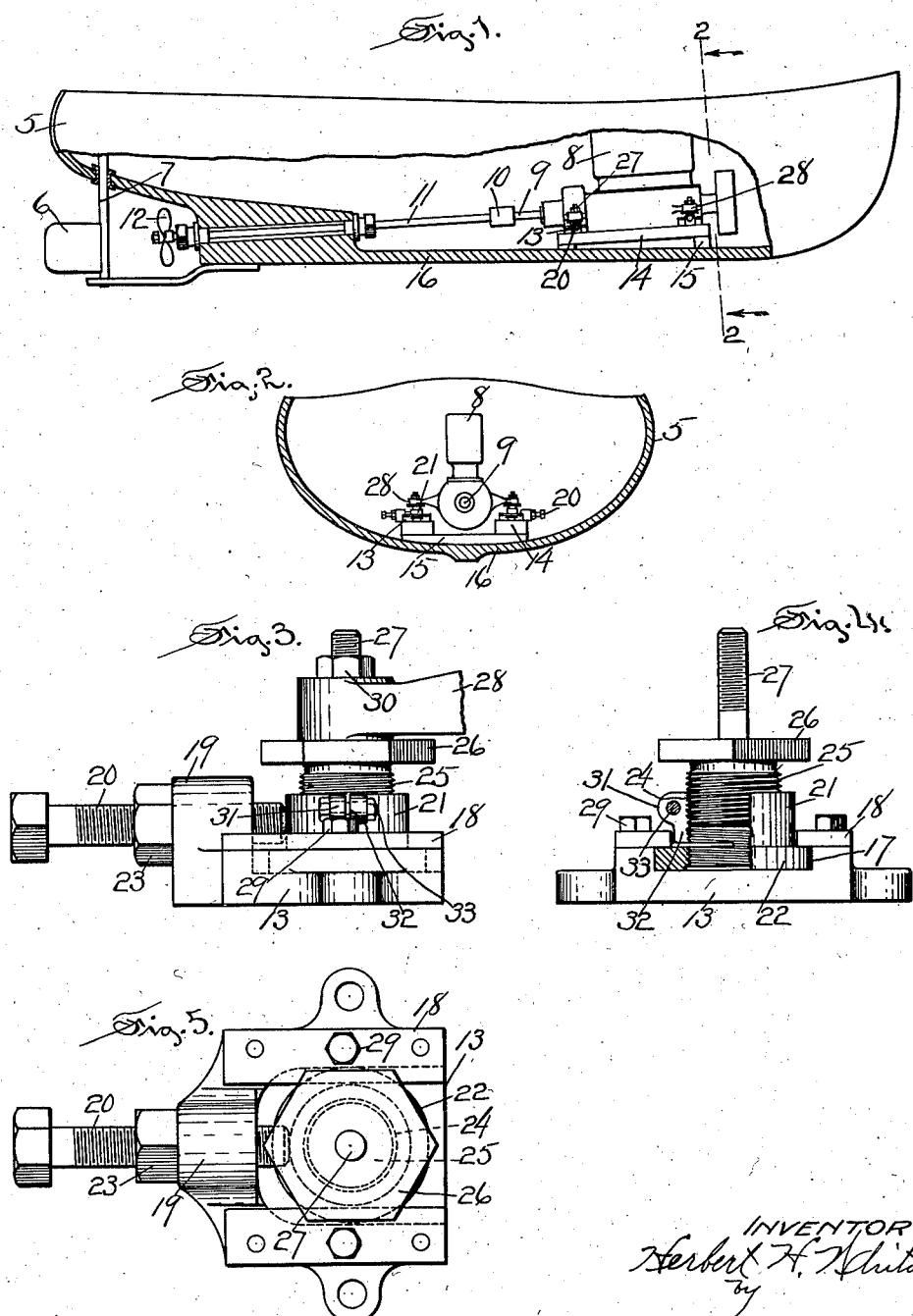

Patented Oct. 20, 1936

2,057,990

UNITED STATES PATENT OFFICE 2,057,990

ENGINE MOUNT

Herbert W. Whitaker, Hartford, Conn.

Application July 10, 1934, Serial No. 734,492

3 Claims. (Cl. 248—3)

My invention relates to that class of devices for supporting a motor or engine, more particularly as equipped for vehicle use, and an object of my invention, among others, is the provision of means for enabling said engine or motor to be correctly aligned with a propeller or driving shaft to which the engine or crank shaft is connected.

One form of a mount embodying my invention and in the construction and use of which the objects herein set out, as well as others, may be attained is illustrated in the accompanying drawing, in which Figure 1 is a side view of a boat broken away to show my improved mount installed therein.

Figure 2 is a view in section on a plane denoted by the dotted line 2—2 of Fig. 1.

Figure 3 is a side view of my improved mount.

Figure 4 is a view partially in section and in elevation looking at the mount from a point located at right angles to the point of view of Fig. 3.

Figure 5 is a top view.

Figures 3, 4 and 5 are on enlarged scale.

In the accompanying drawing the numeral 5 denotes a boat of any general form and construction having a rudder 6 secured to a rudder post 7 at its rear end. An engine or motor 8 of any approved form is mounted in the boat, as herein shown toward its front end but it may be located in any desired place in the boat. The engine or crank shaft 9 is connected in any suitable manner with the driving mechanism, as herein shown a coupling 10 connecting said crank shaft with a propeller shaft 11 which extends through the rear end of the boat and has a propeller 12 secured thereto. All of the parts thus far described are of old and well-known construction and a further description thereof is therefore omitted herein, my invention having to do with the means for mounting the engine so that the crank shaft 9 may be correctly aligned with the propeller or driving shaft 11.

My improved mounting comprises a base 13 adapted to be secured to engine stringers 14 or other supports placed as upon floor timbers or leveling strips 15 secured to the frame or bottom 16 of the boat, as shown in Fig. 1. This base has a groove 17 partially formed by straps 18 secured to flanges forming the sides of the groove, and as shown in Fig. 4 of the drawing. An ear 19 projects upwardly from the base on one side thereof and an adjusting screw 20 is mounted in said ear with one end adapted to press against a supporting block 21 having a flange 22 located in the groove 17, the straps 18 overlying said flange to secure said block 21 tightly in place. A lock nut 23 may be employed for securing the screw 20 in place.

The block 21 has a screw threaded opening 24 to receive a threaded shank 25 of an engine support 26, in the structure herein shown said support comprising a flange projecting laterally from the shank 25, and as shown in Figs. 3 and 4 of the drawing.

A threaded post 27 extends upwardly from the support 26 in position to be received within a hole in an arm or flange 28 extending from the engine at the base thereof, such members when in the form of arms extending from opposite corners of the engine base, and in any event, my improved mounting being located preferably at the four corners of the base so that each corner may be adjusted independently of the other corners.

When an engine is to be installed, or when it is desired to adjust the crank shaft in to alignment with the propeller shaft the securing means, as nuts 29 for the gibs 18, are loosened, and then by means of the adjusting screw 20 the supporting block 21 may be moved along the groove in the base 13, this providing for a horizontal adjustment. A nut 30 on the post 27 is loosened and then by means of the support 26, which is preferably of angular shape so that it may receive a wrench, said support may be turned and the threaded shank 25 thereof will cause the support to be raised or lowered to provide for vertical adjustment of a corner of an engine base.

It will now be seen that with my improved engine mount located at each of the four corners of the engine base said base may be moved laterally to place it in any position desired and to align the crank shaft 9 with the propeller shaft 11, and by means of the supports 26 the corners of the engine may be separately raised or lowered to any desired position for the purpose of aligning the two shafts, and when so aligned the engine may be held rigidly by the nuts hereinbefore described for such purpose.

This provides for a correct aligning of the shafts when the engine is originally installed in a boat, and it also provides for aligning the said shafts whenever they may get out of alignment for any reason as by warping or twisting of the boat structure or from other cause.

As a means for retaining the engine support 26 securely in place the block 21 is split on one side and ears 31 are projected from said block on opposite sides of the slot 32 to receive a clamping bolt 33 by means of which the shank 25 is clamped tightly in place.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. An engine mount including supporting elements having grooves therein, an ear rising above each of said supporting elements at the ends of said grooves, a supporting block projecting out of each groove and having a flange adjustably positioned in said groove, means engaged with each ear for moving said blocks in said grooves independently of said supporting elements, means for securing said blocks in place, and an engine support threadedly engaged with said block to provide for the support of an engine base on said block, said supporting elements being mounted to effect movements of the engine in directions laterally of the axis of the engine shaft.

2. An engine mount including supporting elements having grooves therein, a supporting block projecting out of each groove and having a flange movably located in said groove, gibs to engage said flange to retain said block in place, an ear projecting above each of said elements at the end of the grooves, an adjusting screw projecting through said ear to engage said block to move it in said groove, and an engine support threadedly engaged with each of said blocks to provide for the support of an engine base by said supporting elements, said supporting elements being mounted to effect movements of the engine in directions laterally of the axis of the engine shaft.

3. In combination with an engine base supporting an engine with a crank shaft located therein, an independent engine mount located at each corner of the engine base, each of said mounts including a supporting base having a groove extending crosswise relatively to said crank shaft, a supporting block horizontally adjustably mounted in said base for movement crosswise relatively to said crank shaft, means for moving said block in said groove, and an engine support vertically adjustably engaged with said block for vertical adjustment of the position of said engine.

HERBERT W. WHITAKER.